J. R. WINTER.
BOX.
APPLICATION FILED SEPT. 22, 1911.

1,075,456.

Patented Oct. 14, 1913.

WITNESSES:
J. H. Perrault
H. W. Kreinbring.

INVENTOR
John R. Winter.
BY
Edward N. Pagelsen,
ATTORNEY

COLUMBIA PLANOGRAPH CO., WASHINGTON, D. C.

UNITED STATES PATENT OFFICE.

JOHN R. WINTER, OF DETROIT, MICHIGAN, ASSIGNOR TO DETROIT UTENSIL COMPANY, OF DETROIT, MICHIGAN, A CORPORATION OF MICHIGAN.

BOX.

1,075,456.  Specification of Letters Patent.  Patented Oct. 14, 1913.

Application filed September 22, 1911. Serial No. 650,795.

*To all whom it may concern:*

Be it known that I, JOHN R. WINTER, a citizen of the United States, and a resident of Detroit, in the county of Wayne and State of Michigan, have invented a new and useful Box, of which the following is a specification.

This invention relates to means for protecting packages, and bottles of milk or cream during such hours as are inconvenient for the house-holder to receive the same, and its object is to provide a receptacle having a door which may be readily opened at all times, until a certain object, usually a milk bottle, shall be placed in a certain predetermined position within the receptacle, after which the door will be locked and can only be opened by the use of a proper key.

Figure 1:
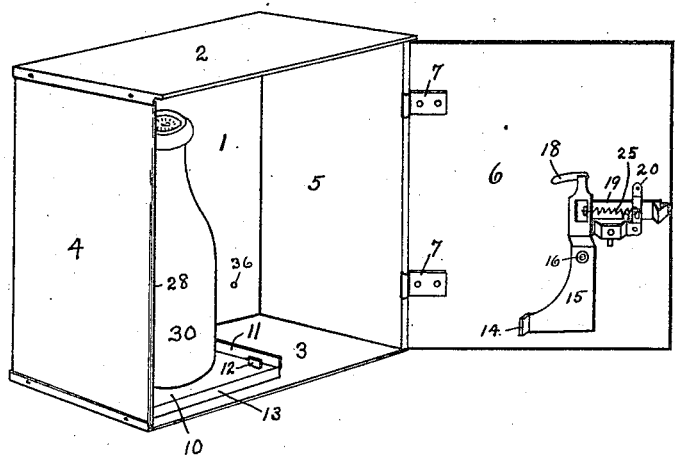
Figure 2:
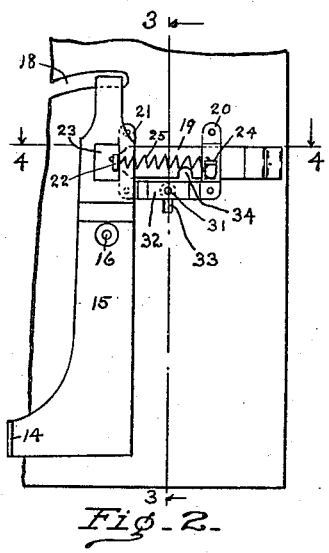
Figure 3:
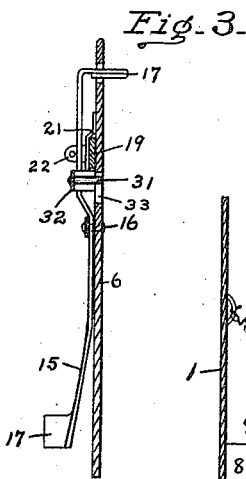
Figure 5:
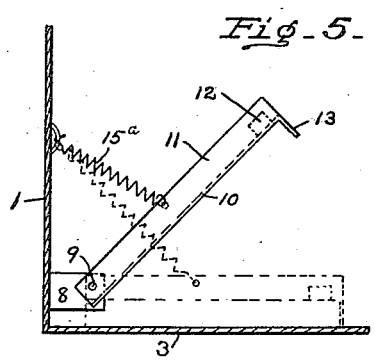
Figure 4:
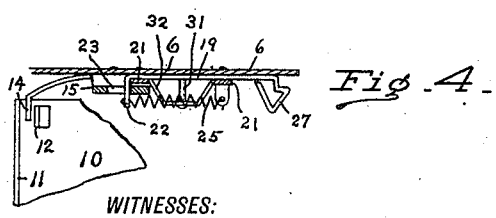

In the accompanying drawing, Figure 1 is a perspective view of this milk receptacle with the door open. Fig. 2 is an elevation of a portion of the inner side of the door, on a larger scale. The Fig. 3 is a section on the line 3—3 of Fig. 2. Fig. 4 is a horizontal section on the line 4—4 of Fig. 2. Fig. 5 is a view of the trap-platform.

Similar reference characters refer to like parts throughout the several views.

It is customary for house-wives to place empty milk bottles on back steps, or in other readily accessible places, so they may be easily taken up and others substituted by the milk-man, who commonly makes his rounds long before other people are awake. These bottles, as well as those left by the milk-man, are readily accessible to dogs and sneak-thieves. The box shown on the drawing may be secured at any desirable location, and is so constructed that it may be readily opened until a bottle or package of proper weight is placed in a predetermined location, after which it can only be opened by the use of a proper key.

The box itself is formed with a back 1, top 2, bottom 3, sides 4 and 5, and a front door 6, which is connected to the side 5 by means of hinges 7. Pivoted on a small rod 9 which is carried by the brackets 8 that extend from the back 1, is a trap platform 10, having side flanges 11, a down-turned front flange 13, and a small upwardly extended lip 12. As will be seen in Figs. 1 and 4, a space between the lip 12 and a side flange 11 is sufficient to admit finger 14 on the lever 15. This plate or trap-platform 10 is normally held in the position shown in Fig. 5 by a spring 15ª, whose upper end connects in any desirable manner to the back 1.

The lever 15 is mounted on the pivot 16, carried by the door, and has a finger 17 which extends through a slot 18 in the door in such a manner that it can be manipulated from the front. A bolt 19, preferably flat, is slidable in guides 20 and 21, and has a finger 22 on its inner end which extends through a slot 23 in the lever 15. To a small lug 24 on the guide 20, is secured one end of a spring 25, the other end of which connects to this finger 22 and therefore normally holds the bolt outward. The outer end of the metal forming the bolt is bent as shown in Fig. 4 so as to form an incline 27, which, when it engages the inturned edge 28 of the side 4, will force the bolt inward so it may snap behind this edge 28. It will be apparent that when the finger 17 of the lever is moved toward the hinged edge of the door that the bolt will be pulled back to permit the door to open, but that when a bottle 30, or other article, holds down the trap-platform 10, the lever 15 will be locked so that the bolt cannot be withdrawn in this manner.

A pin 31 for a key is carried by a small bracket 32, and the key may enter through the key-hole 33. The bolt has a notch 34 for the bit of the key.

The operation is as follows: The box may be secured to a wall or post by means of screws which pass through holes 36 in the back. Empty bottles may be placed on the bottom beside the trap-platform 10 and on the top 2; milk-tickets when placed within the box also being safe from being blown away. The milk-man opens the door by swinging the finger 17 over toward the hinge 7, thus drawing back the bolt, and after removing the tickets and empty bottles, places one full bottle on the trap-platform and the others beside it, and closes the door. The finger 14 on the lever 15 enters the space between the lip 12 and the adjacent flange 11 and is prevented from moving, and with it, the lever 15. The door can be unlocked by the use of a proper key, when the contents may be removed. As soon as the trap-platform 10 is relieved, it resumes the position shown in Fig. 5, when the lever 15 is again free to move. The slot 23 in the lever is made sufficiently large to permit the finger 22 on the bolt to move a sufficient distance to release the door while the lever is stationary. It will be understood that this box may be of any desired proportions and capacity and that its use is not limited to milk bottles. Its details may be changed to suit requirements without departing from the spirit of my invention.

Having now explained my construction, what I claim as my invention and desire to secure by Letters Patent is:—

1. In a box, the combination of a body, a door hinged thereto, a trap-platform hinged at its rear end in said body and having an upwardly extending projection near its front edge, a spring to normally hold the trap-platform in an inclined position, a lever pivoted to said door and having a finger at its upper end projecting outward through a slot in the door and having a finger at its lower end adapted to extend adjacent the projection on the trap-platform when the same is in its lowest position, a locking-bolt slidably mounted on the door of the box and having a finger extending through a slot in the lever whereby movement of the lever will withdraw the bolt, and a spring to move the bolt to locking position.

2. A box comprising sides, back, top, bottom and a door hinged to one side, a trap-platform pivotally mounted within the box, locking mechanism mounted on the door, said door provided with a key-hole wherethrough a key may be inserted to release the locking mechanism, and a lever mounted on the door and provided with a manually-operable projection whereby the lever may be actuated independently of the key to unlock the door, said trap-platform adapted to swing down to engage and prevent the operation of the lever.

3. A box comprising a body and a door hinged thereto, a key-operated lock for said door, comprising a bolt, guides for the same and a spring, to move the bolt to locking position, said bolt having an inwardly projecting finger, a lever pivoted on the door and having a slot through which said finger extends and a projection extending through a slot in the door by means of which the lever may be swung and the bolt withdrawn, and a trap-platform mounted in the body and movable into the path of the lever to prevent its movement, said slot in the lever being of such length as to permit the withdrawal of the bolt by a key.

In testimony whereof I have signed this specification in the presence of two subscribing witnesses.

JOHN R. WINTER.

Witnesses:
 CHAS. E. HUBBARD,
 M. S. WALKER.

---

Copies of this patent may be obtained for five cents each, by addressing the "Commissioner of Patents, Washington, D. C."